United States Patent
Waggle et al.

(10) Patent No.: US 10,131,005 B2
(45) Date of Patent: Nov. 20, 2018

(54) ADJUSTABLE CARTRIDGE ASSEMBLY FOR CUTTING TOOL

(71) Applicant: Kennametal Inc., Latrobe, PA (US)

(72) Inventors: James Michael Waggle, Derry, PA (US); Kevin Michael Gamble, Stahlstown, PA (US)

(73) Assignee: KENNAMETAL INC., Latrobe, PA (US)

( * ) Notice: Subject to any disclaimer, the term of this patent is extended or adjusted under 35 U.S.C. 154(b) by 130 days.

(21) Appl. No.: 15/402,546

(22) Filed: Jan. 10, 2017

(65) Prior Publication Data

US 2018/0193930 A1 Jul. 12, 2018

(51) Int. Cl.
*B23C 5/24* (2006.01)

(52) U.S. Cl.
CPC .................. *B23C 5/2406* (2013.01)

(58) Field of Classification Search
CPC ..... B23C 5/241; B23C 5/2462; B23C 5/2479; B23C 5/2444
See application file for complete search history.

(56) References Cited

U.S. PATENT DOCUMENTS

| | | | | |
|---|---|---|---|---|
| 3,220,089 A * | 11/1965 | Hammers | ........... | B23B 29/0341 407/101 |
| 3,498,164 A * | 3/1970 | McCue | ................... | B23B 29/04 407/103 |
| 3,785,746 A | 1/1974 | Wolf et al. | | |
| 5,209,610 A * | 5/1993 | Arai | ......................... | B23C 5/241 407/36 |
| 5,733,073 A * | 3/1998 | Zitzlaff | .................... | B23B 27/16 407/102 |
| 5,868,529 A * | 2/1999 | Rothballer | ............ | B23C 5/2444 407/36 |
| 6,942,432 B2 * | 9/2005 | Noggle | ...................... | B23C 5/06 407/40 |
| 7,163,360 B2 * | 1/2007 | Toyose | ...................... | B23C 5/00 407/36 |
| 8,092,124 B2 * | 1/2012 | Spichtinger | ............. | B23C 5/006 407/11 |
| 8,978,526 B2 * | 3/2015 | Nedzlek | .................... | B23C 5/08 407/75 |
| 2003/0202848 A1 | 10/2003 | Gamble et al. | | |
| 2005/0260045 A1 * | 11/2005 | Raab | ................. | B23B 29/03417 407/46 |

(Continued)

FOREIGN PATENT DOCUMENTS

DE 298 15 289 U1 12/1998

*Primary Examiner* — Will Fridie, Jr.
(74) *Attorney, Agent, or Firm* — Matthew S. Bedsole (57) ABSTRACT

A cutting tool includes a cartridge-receiving pocket, and an adjustable cartridge assembly mounted in the cartridge-receiving pocket. The adjustable cartridge assembly includes a cartridge with an insert-receiving pocket and a wedge. The wedge has planar surfaces formed at taper angles of between greater than zero degrees and less than or equal to about five degrees that contact the bottom wall of the cartridge to move a cutting insert mounted in the insert-receiving pocket of the cartridge in a direction of a central axis of the cutting tool. The planar surfaces are at different distances from a central axis of the wedge to place the wedge in a minus, nominal or plus orientation, respectively.

20 Claims, 9 Drawing Sheets

(56) References Cited

U.S. PATENT DOCUMENTS

2009/0080984 A1* 3/2009 Lehmann ............ B23B 29/0341
407/79
2015/0217384 A1* 8/2015 Saji ........................ B23C 5/241
407/78

* cited by examiner

ADJUSTABLE CARTRIDGE ASSEMBLY FOR CUTTING TOOL

BACKGROUND OF THE INVENTION

Field of the Invention

The invention relates to a cartridge for a cutting tool. More particularly, the invention pertains to an adjustable cartridge assembly for precise vertical (i.e. height) adjustment of the cutting insert mounted in the adjustable cartridge assembly.

Description of Related Art

Conventional adjustable cartridges for adjusting a vertical position of a cutting insert mounted in the cartridge typically use a lockdown screw after adjustment of the vertical position of the cutting insert. Unfortunately, the lockdown screw can cause the cartridge to move after adjustment, thereby decreasing the accuracy of the adjustment of the vertical position of the cutting insert. Thus, there is a need to eliminate the lockdown screw in adjustable cartridges.

SUMMARY OF THE INVENTION

The problem of eliminating the lockdown screw in an adjustable cartridge is solved by providing a wedge with a very shallow taper angle that cooperates with a cartridge and a spring exerting an opposing force to provide very fine and precise vertical adjustment of the cutting insert mounted in the adjustable cartridge.

In one aspect of the invention, a cutting tool comprises a cartridge-receiving pocket, and an adjustable cartridge assembly mounted in the cartridge-receiving pocket. The adjustable cartridge assembly comprises a cartridge with an insert-receiving pocket and a wedge. The cartridge includes a bottom wall and the wedge has a plurality of planar surfaces formed at a taper angle with respect to a plane that is parallel to a central axis of the wedge. At least one of the planar surfaces contacts the bottom wall of the cartridge to selectively adjust a vertical position of a cutting insert mounted in the insert-receiving pocket of the cartridge.

In another aspect of the invention, an adjustable cartridge assembly comprises a cartridge with an insert-receiving pocket and a wedge. The cartridge includes a bottom wall and the wedge has a plurality of planar surfaces formed at a taper angle with respect to a plane that is parallel to a central axis of the wedge. At least one of the planar surfaces contacts the bottom wall of the cartridge. Rotation of a threaded fastener disposed within the wedge causes the wedge to move in a direction of a central axis of the wedge and causes a cutting insert mounted in the insert-receiving pocket of the cartridge to move in a direction of a central axis of a cutting tool.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
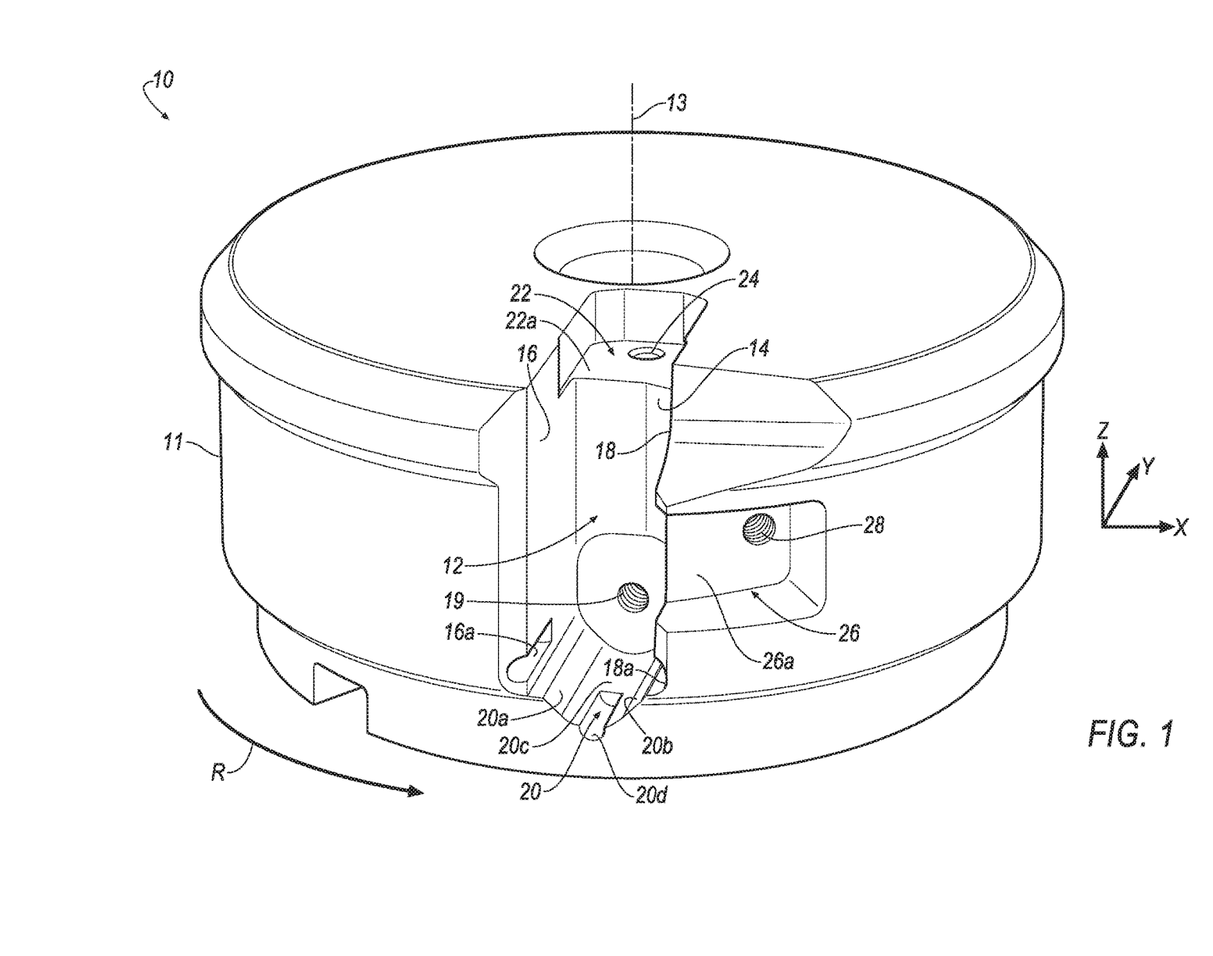
FIG. 1 is an isometric view of a cutting tool with a cartridge-receiving pocket in accordance with an embodiment of the invention.

Referring now to FIG. 1, a cutting tool 10, for example, a face milling cutter, includes a generally cylindrical body 11 with at least one cartridge-receiving pocket 12 according to an embodiment of the invention. It will be appreciated that the cutting tool 10 shown in FIG. 1 is simplified view of the cutting tool 10, and the cutting tool 10 may include a plurality of cartridge-receiving pockets 12, but only one cartridge-receiving pocket 12 is shown in FIG. 1 for simplification and clarity. The cutting tool 10 rotates about a central axis 13 in a direction, R.

In general, the cartridge-receiving pocket 12 includes a radial support wall 14 and an axial support wall 16 for engaging an adjustable cartridge assembly 30, which is described in more detail below. The radial support wall 14 and the axial support wall 16 allow the cartridge 32 (FIG. 2) to slide in a vertical direction (i.e., in the direction of the z-axis) of the cutting tool 10. The cartridge-receiving pocket 12 has a threaded bore 19 extending substantially perpendicular to the central axis 13 (i.e. in the direction of the y-axis) of the cutting tool 10. The cartridge-receiving pocket 12 also includes a generally V-shaped cavity, shown generally at 20. The V-shaped cavity 20 is formed by a pair of opposing side surfaces 20a, 20b and an arcuate bottom surface 20c. The side surfaces 20a, 20b allow the wedge 34 (FIG. 2) to slide in a radial direction (i.e. in the direction of the Y-axis) within the cartridge-receiving pocket 12. The axial support wall 16 includes a groove 16a extending radially inward from the outer surface of the body 11. Similarly, a wall 18 includes a groove 18a extending radially inward from the outer surface of the body 11. Likewise, the bottom surface 20c of the V-shaped cavity 20 includes a groove 20d extending radially inward from the outer surface of the body 11. The purpose of the grooves 16a, 18a and 20d will be explained in more detail below.

The cartridge-receiving pocket 12 also includes a first cavity, shown generally at 22, extending radially inward (i.e. in the direction of the y-axis) with respect to the radial support wall 14. The cavity 22 has a bottom surface 22a with a threaded bore 24. The threaded bore 24 is substantially parallel to the central axis 13 (i.e. z-axis) of the cutting tool 10. The cartridge-receiving pocket 12 also includes a second cavity, shown generally at 26, extending axially outward (i.e. in the direction of the x-axis) with respect to the axial support wall 16. In the illustrated embodiment, the second cavity 26 extends axially outward with respect to the axial support wall 16. Similar to the first cavity 22, the second cavity 26 has a bottom surface 26a with a threaded bore 28. The purpose of the first and second cavities 22, 26 will be discussed in more detail below.

Referring now to FIGS. 2-6, an adjustable cartridge assembly 30 is shown according to an embodiment of the invention. The adjustable cartridge assembly 30 includes two basic components: a cartridge, shown generally at 32, and a wedge, shown generally at 34, both of which are mounted within the cartridge-receiving pocket 12 of the milling cutter 10. The adjustable cartridge assembly 30 of the invention provides the technical advantage of precise vertical adjustment (i.e., height adjustment) of the cutting insert 60 without the need for a lockdown screw.

Figure 4:
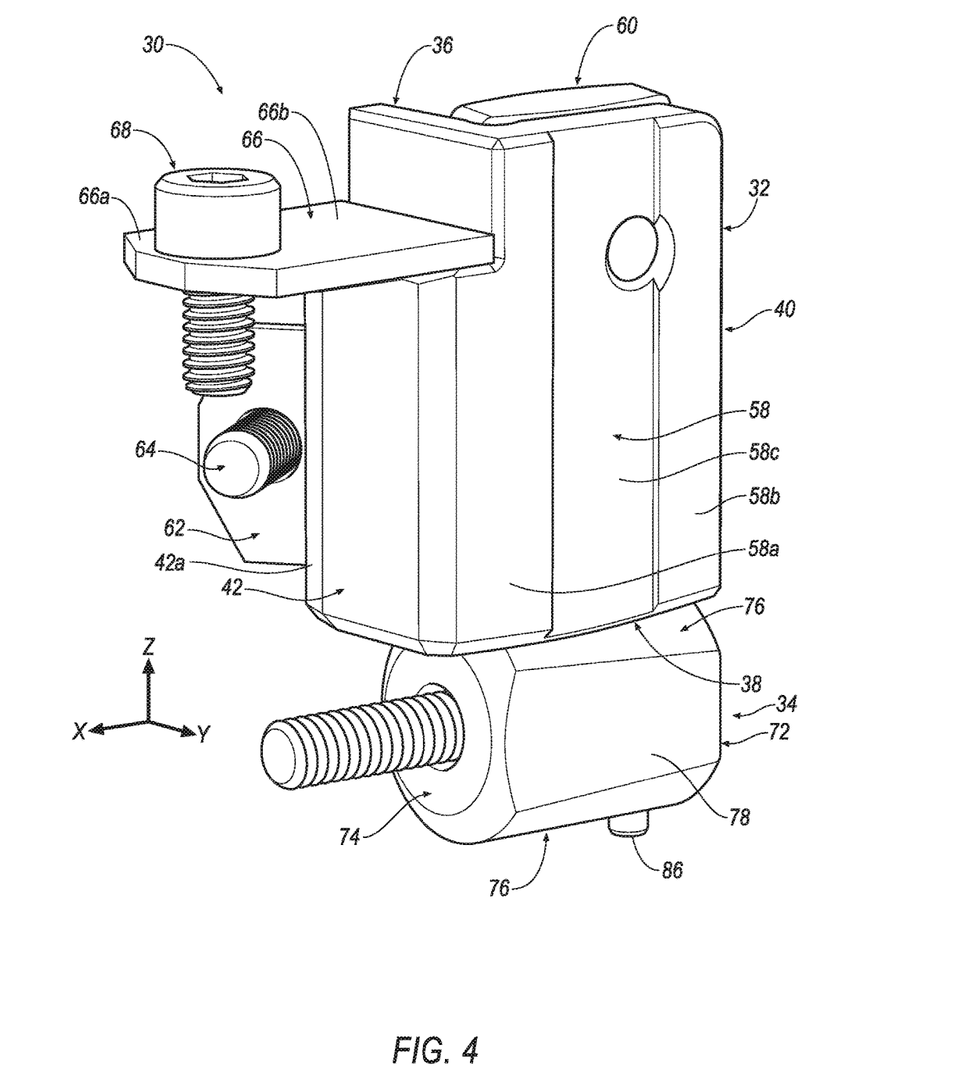
FIG. 4 is an enlarged isometric rear view of the adjustable cartridge assembly according to an embodiment of the invention.
Figure 5:
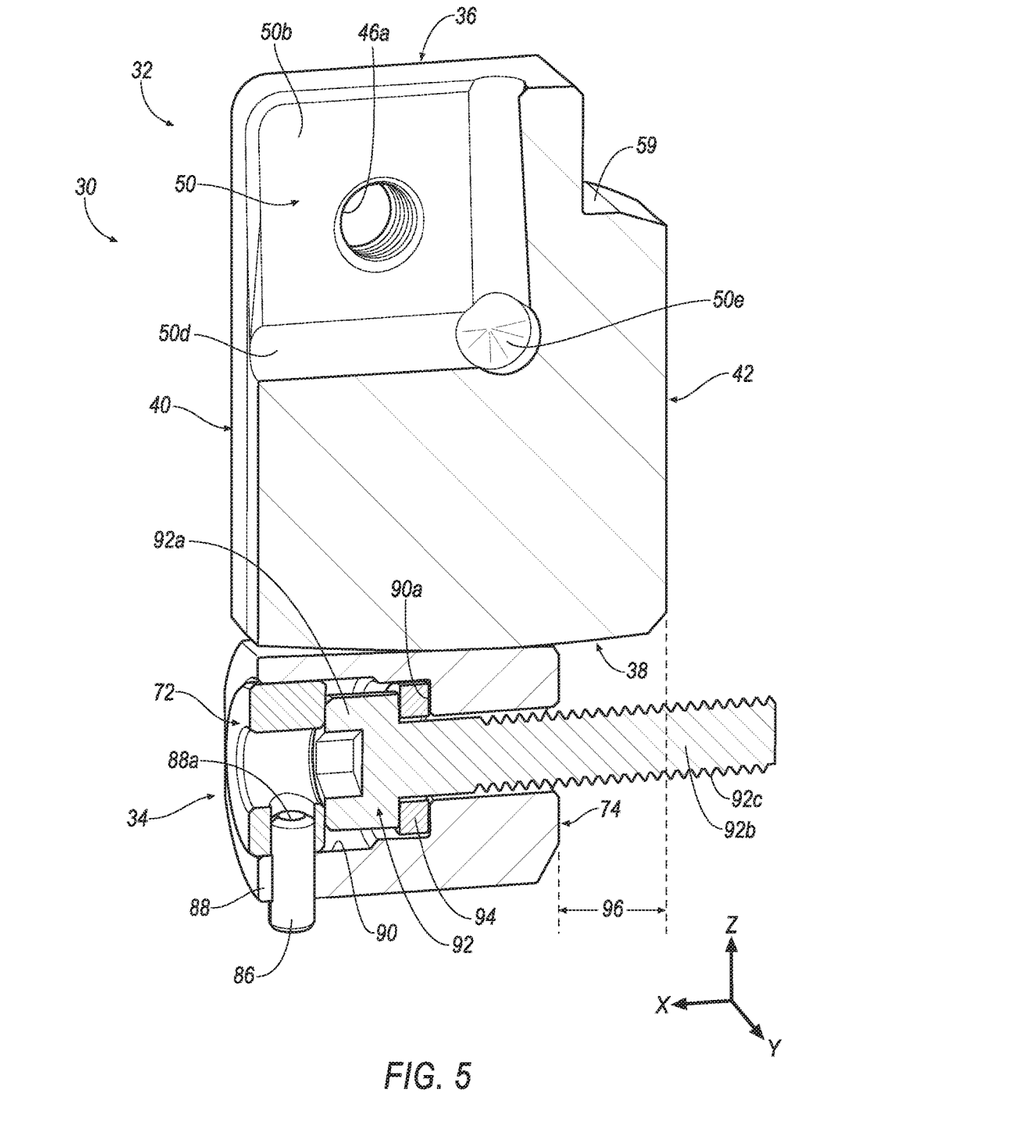
FIG. 5 is an enlarged cutaway view of the adjustable cartridge assembly according to an embodiment of the invention.

The cartridge 32 is generally L-shaped having a L-shaped, substantially planar top wall 36, a generally rectangular bottom wall 38 opposite the top wall 36, a generally L-shaped first side wall 40 extending between the top and bottom walls 36, 38, and a generally rectangular second, opposite side wall 42 extending between the top and bottom walls 36, 38. The first side wall 40 may have one or more faceted surfaces 40a, 40b, 40c. As seen in FIG. 4, the second side wall 42 includes a radial support wall 42a and a ledge 59 substantially extending along the x-axis of the cartridge 32. The purpose of the ledge 59 is described in more detail below.

The cartridge 32 also includes a substantially planar front wall, shown generally at 44, with an upper portion 46 and a lower portion 48. The upper portion 46 extends from the top wall 36 to the lower portion 48, and includes an insert-receiving pocket, shown generally at 50. The lower portion 48 extends from the bottom wall 38 to the insert-receiving pocket 50 and includes a ledge 52 extending from the bottom wall 38 to the insert-receiving pocket 50. The ledge 52 is substantially perpendicular to the ledge 59 formed in the second side wall 44. The purpose of the ledge 52 will be described in more detail below.

The insert-receiving pocket 50 is generally L-shaped and includes a bottom support surface 50a, a rear support surface 50b and a side support surface 50c for supporting a cutting insert 60 (FIG. 6) mounted in the insert-receiving pocket 50. The insert-receiving pocket 50 may also include a first corner radius 50d between the bottom support surface 50a and the rear support surface 50b, and a second corner radius 50e between the bottom support surface 50a and the side support surface 50c. The first and second corner radii 50d, 50e provide clearance for the cutting insert 60 when mounted in the cutting tool 10. The bottom support surface 50a and the side support surface 50c may comprise a raised rib to provide a suitable contact surface for the cutting insert 60. The rear support surface 50b may be substantially planar and include a threaded bore 46a for receiving an insert screw 69 to secure the cutting insert 60 in the insert-receiving pocket 50. It should be appreciated that the invention is not limited by the way the cutting insert 60 is secured within the insert-receiving pocket 50, and that the cutting insert 60 can be mounted in the insert pocket 50 using any well-known means in the art, such as brazing, and the like.

Figure 6:
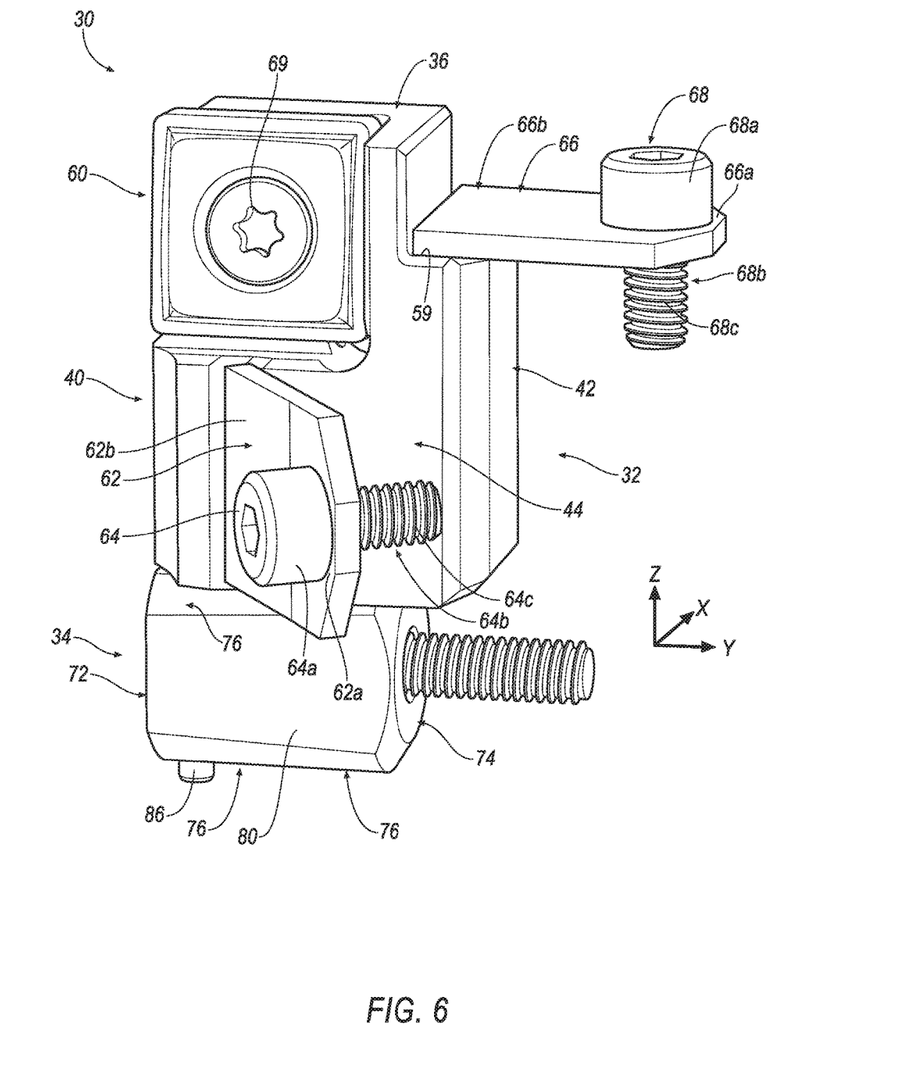
FIG. 6 is an enlarged front isometric view of the adjustable cartridge assembly when a cutting insert is mounted in an insert-receiving pocket of the adjustable cartridge assembly.

As shown in FIG. 6, the cutting insert 60 is a substantially square-shaped insert that is mounted in the insert-receiving pocket 50. However, it will be appreciated that the invention is not limited by the shape of the cutting insert 60, and that the invention can be practiced with any desirable shape of the cutting insert 60, such as triangular, pentagonal, hexagonal, octagonal, and the like.

As shown in FIG. 4, the cartridge 32 includes a generally rectangular-shaped rear wall 58 opposite the front wall 44 having a first end portion 58a, a second end portion 58b and a central portion 58c. A portion of the first end portion 58a, the second end portion 58b and the central portion 58c extend from the top wall 36 to the bottom wall 38. A portion of the first end portion 58a extends from the bottom wall 38 to the ledge 59.

As mentioned above, the front wall 44 includes the first ledge 52 extending along the z-axis of the cartridge 32 and the second side wall 44 includes the ledge 59 extending along the x-axis of the cartridge 32 (i.e. perpendicular to the ledge 52). As seen in FIG. 6, the cartridge assembly 30 further includes a first plate member 62 having a first end 62a capable of receiving a first threaded fastener 64, such as a cap screw, and the like, and a second, opposite end 62b. The threaded fastener 64 includes a head portion 64a and a shank portion 64b with threads 64c that can be threaded into the threaded bore 28 in the cavity 26 (FIG. 1). The first plate member 62 has sufficient dimensions such that the second end 62b of the first plate member 62 engages the first ledge 52 and acts as a flat spring to exert a biasing force in the radially inward direction (i.e. in the direction of the y-axis of the cartridge 32). In this manner, the first plate member 62 eliminates any unwanted movement of the adjustable cartridge assembly 30 in the direction of the y-axis of the cartridge 32.

Similarly, the cartridge assembly 30 further includes a second plate member 66 having a first end 66a capable of receiving a first threaded fastener 68, such as a cap screw, and the like, and a second, opposite end 66b. The threaded fastener 68 includes a head portion 68a and a shank portion 68b with threads 68c that can be threaded into the threaded bore 24 in the cavity 22 (FIG. 1). The second plate member 66 has sufficient dimensions such that the second end 66b of the second plate member 66 engages the second ledge 59 and acts as a flat spring to exert a biasing force on the cartridge 32 in the axial direction (i.e. in the direction of the z-axis of the cartridge 32). In this manner, the second plate member 66 eliminates any unwanted movement of the adjustable cartridge assembly 30 in the direction of the z-axis of the cartridge 32. The first and second plate members 62, 66 eliminates the need of a lockdown screw.

As seen in FIGS. 2-6, the wedge 34 has an end surface 72, an opposing end surface 74 and a generally cylindrical outer surface 76, except for one or more substantially planar surfaces 78, 79, 80 extending between the end surfaces 72, 74. In one aspect of the invention, the wedge 34 includes three planar surfaces 78, 79, 80 that can be selected by the user to engage the bottom surface 38 of cartridge 32 to cause the desired vertical movement (i.e. in the direction of the z-axis) of the cartridge 32 and the desired height adjustment of the cutting insert 60. Each planar surface 78, 79, 80 is formed at a taper angle 82 with respect to a plane 84 that is substantially parallel to a central axis 85 of the wedge 34.

Figure 2:
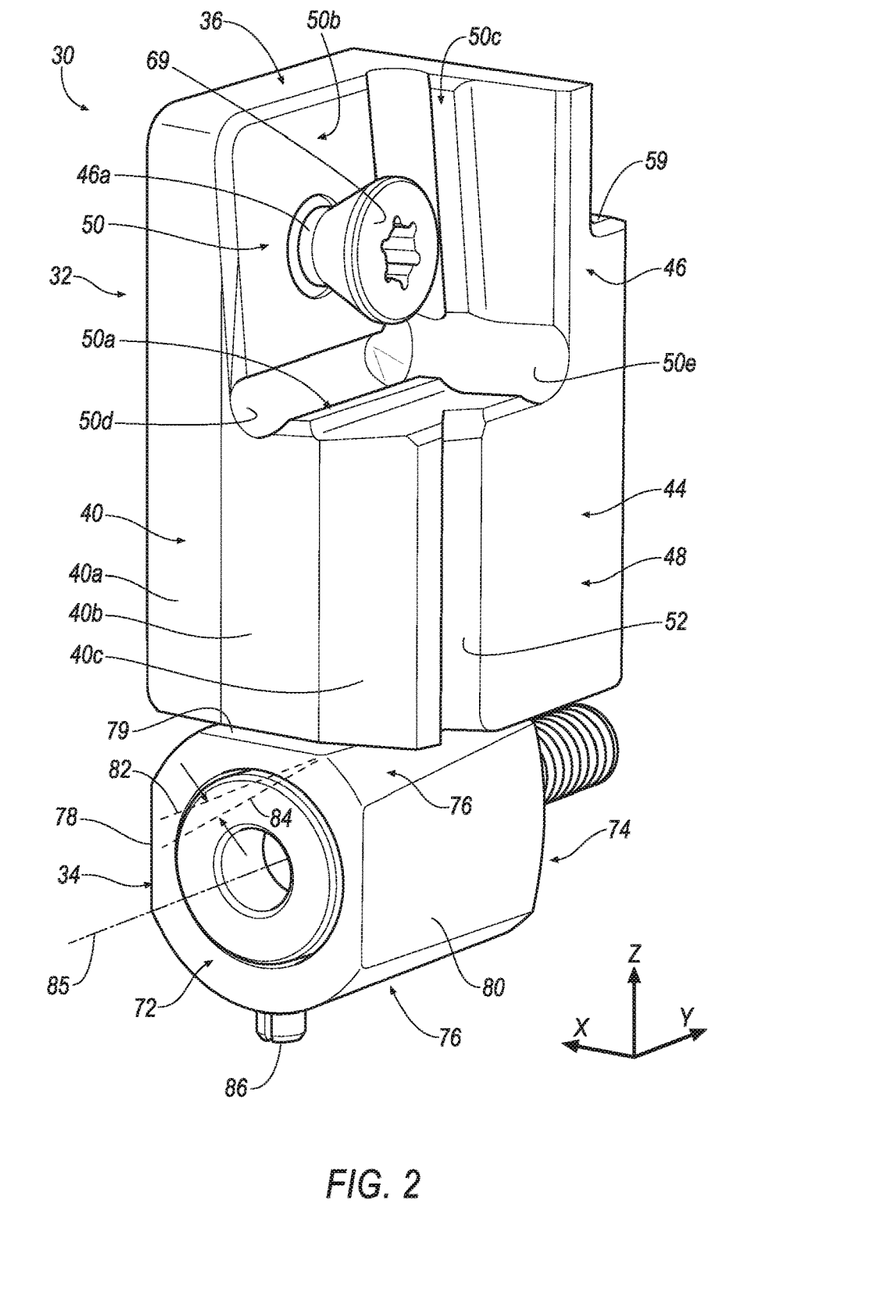
FIG. 2 is an enlarged isometric view of an adjustable cartridge assembly according to an embodiment of the invention.

For example, FIG. 2 shows the taper angle 82 for the planar surface 79. Similarly, the planar surface 78, 80 are formed with a taper angle 82. In one embodiment, the taper angles 81, 82, 83 are greater than 0 degrees and less than or equal to about 5 degrees. It should be appreciated that the taper angle 82 may be the same in magnitude for each planar surface 78, 79, 80, or may be different in magnitude for each planar surface 78, 79, 80, or any combination thereof.

Figure 3:
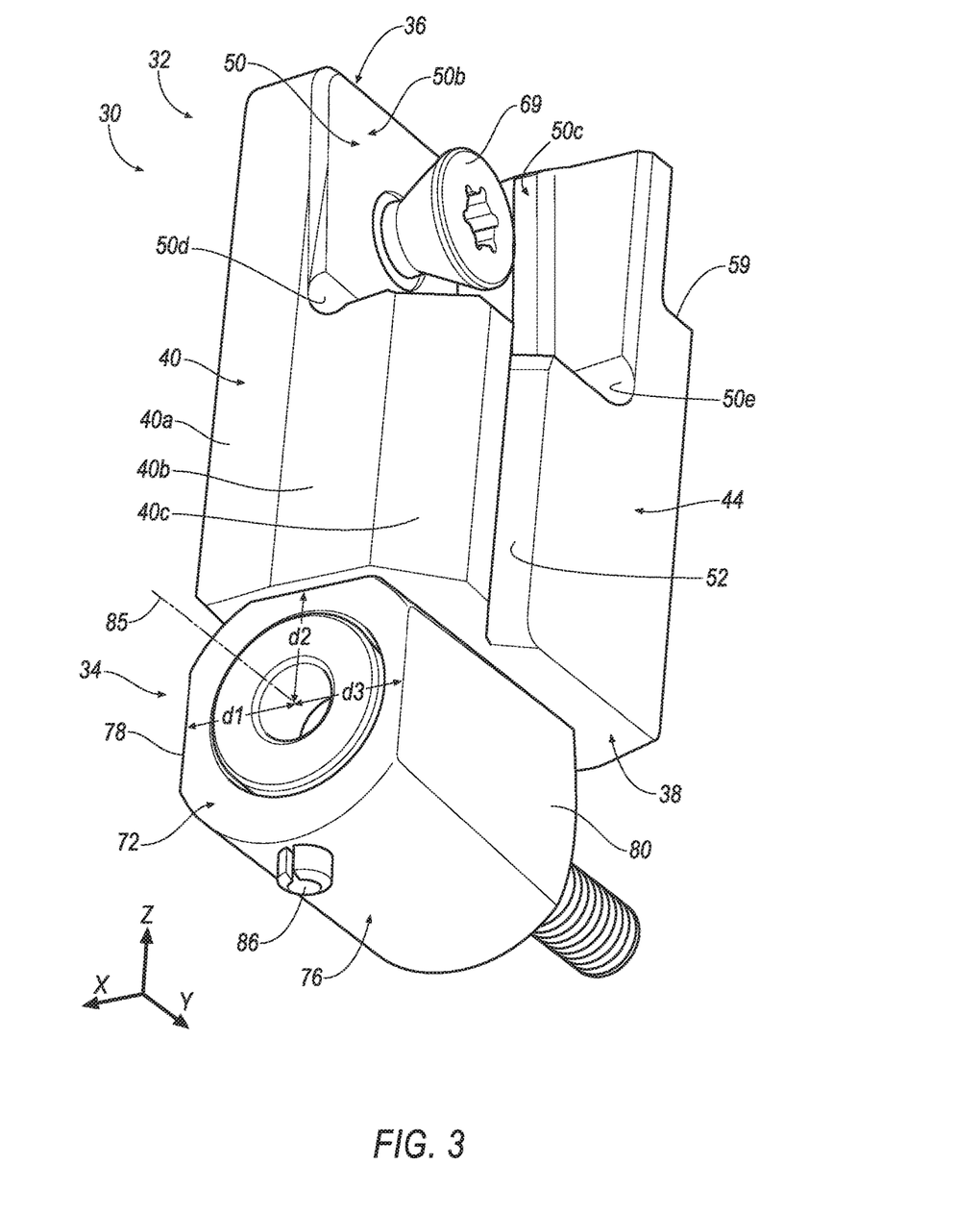
FIG. 3 is an enlarged isometric bottom view of the adjustable cartridge assembly according to an embodiment of the invention.

The cylindrical outer surface 76 contacts the pair of opposing side surfaces 20a, 20b of the V-shaped cavity 20 (FIG. 1) when the wedge 34 is inserted into the V-shaped cavity 20 to provide two-line contact with the cartridge-receiving pocket 12. As shown in FIG. 3, for example, the planar surface 79 contacts the bottom wall 38 of the cartridge 32, thereby providing single line contact with the cartridge 32.

Another aspect of the invention is that the planar surfaces 78, 79, 80 may be at the same distance, a different distance, or any combination of distances from the central axis 85 of the wedge 34. As shown in FIG. 3, for example, the planar surface 78 is located at a first distance, d1, from the central axis 85, the planar surface 79 is located at a second distance, d2, from the central axis 85, and the planar surface 80 is located at a third distance, d3, from the central axis 85. In the illustrated embodiment, the first distance, d1, is greater than the second distance, d2, and the second distance, d2, is greater than the third distance, d3. Thus, the wedge 34 can be positioned at a plurality of different orientations in the V-shaped cavity 20 by rotating the wedge 34 about the central axis 85, to select which planar surface 78, 79, 80 contacts the bottom wall 80 of the cartridge 32. An indicator pin 86 is provided in the wedge 34 opposite the planar surface 79 (i.e. between the planar surfaces 78, 80) to provide a visual indication of the orientation of the wedge 34 in the V-shaped cavity 20 of the cartridge-receiving pocket 12. The indicator pin 86 has dimensions such that the indicator pin 86 can be located in one of the grooves 16a, 18a, 20d (FIG. 1) formed in the axial support walls 16, 18 and the V-shaped cavity 20, respectively. The body 11 of the cutting tool 10 may include indicia, such as a plus sign and/or a minus sign (not shown) proximate the grooves 16a, 18a, to indicate the orientation of the indicator pin 86 in the plus and minus orientation, respectively.

Figure 7:
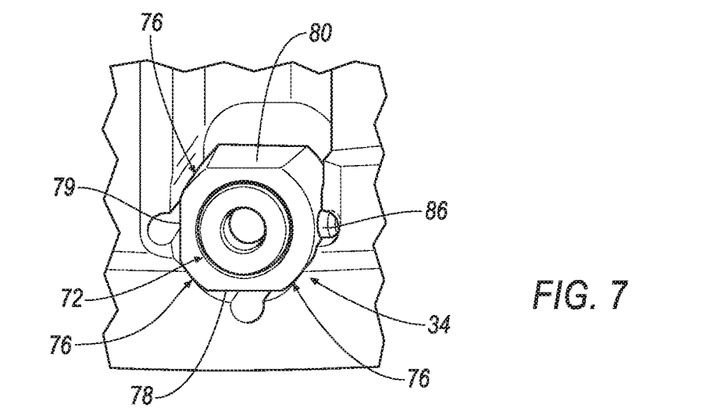
FIG. 7 is a front view of the wedge of the adjustable cartridge assembly in a minus orientation according to an embodiment of the invention.

As shown in FIG. 7, the wedge 34 is in V-shaped cavity 20 of the cartridge-receiving pocket 12 in the minus orientation. In the minus orientation, the planar surface 80, which has the smallest distance, d3, from the central axis 85 will contact the bottom surface 38 of the cartridge 32. Thus, in the minus orientation, the wedge 34 is positioned in the V-shaped cavity 20 to account for the largest sum of dimensional tolerances.

Figure 8:
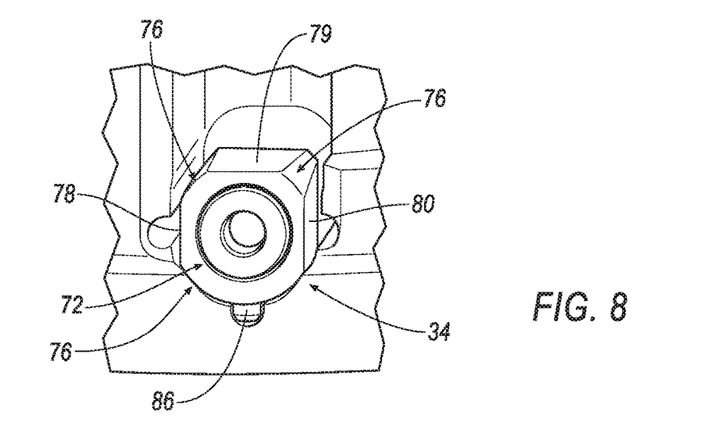
FIG. 8 is a front view of the wedge of the adjustable cartridge assembly in a nominal orientation according to an embodiment of the invention.

As shown in FIG. 8, the wedge is in the V-shaped cavity 20 of the cartridge-receiving pocket 12 in the nominal orientation. In the nominal orientation, the planar surface 79, which has the middle distance, d2, from the central axis 85 will contact the bottom surface 38 of the cartridge 32. Thus, in the nominal orientation, the wedge 34 is positioned in the V-shaped cavity 20 to account for the nominal amount of dimensional tolerances.

Figure 9:
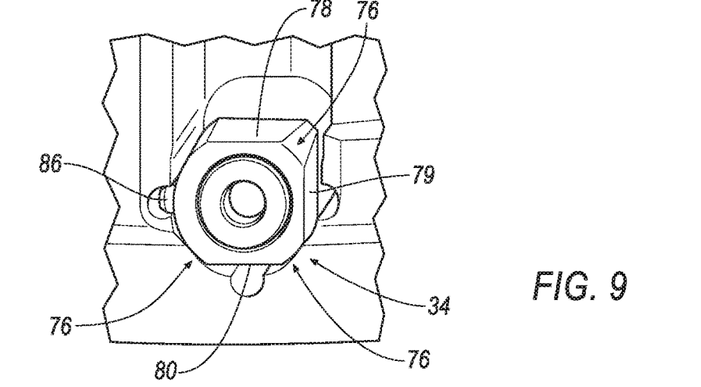
FIG. 9 is a front view of the wedge of the adjustable cartridge assembly in a plus orientation according to an embodiment of the invention.

As shown in FIG. 9, the wedge is in V-shaped cavity 20 of the cartridge-receiving pocket 12 in the plus orientation. In the plus orientation, the planar surface 78, which has the largest distance, d3, from the central axis 85 will contact the bottom surface 38 of the cartridge 32. Thus, in the plus orientation, the wedge 34 is positioned in the V-shaped cavity 20 to account for the smallest sum of dimensional tolerances.

Referring back to FIG. 5, a stop member 88 is disposed within a cavity 90 of the wedge 34. The stop member 88, such as a metal bushing, and the like, prevents unwanted movement of a threaded fastener 92, such as a cap screw, and the like, when being rotated in a counterclockwise direction. The threaded fastener 92 includes a head portion 92a and a shank portion 92b with threads 92c capable of being threaded into the threaded bore 19 of the insert-receiving pocket 12. The stop member 88 includes a cavity 88a that enables the indicator pin 86 to be press fit into the stop member 88. It should be noted that rotation of the cap screw 92 in a clockwise and/or counterclockwise direction moves the wedge 34 in the direction of a central axis 85 of the wedge 34 (i.e. in the direction of the y-axis), resulting in vertical movement (i.e. in the direction of the z-axis) of the cartridge 32 (and the cutting insert 60 mounted thereon). In the illustrated embodiment, the stop member 88 comprises a bushing made of a relatively soft metal material, such as brass, and the like, that is press fit into the cavity 90 of the wedge 34. However, the invention is not limited by the type of stop member 88, and that the invention can practiced with any desirable stop member, such as a spring pin, and the like. In addition, a metal washer 94 is disposed between the head portion 92a of the threaded fastener 92 and the bottom 90a of the cavity 90. Similar to the stop member 88, the metal washer 94 can be made of a relatively soft metal material, such as brass, and the like. The purpose of the metal washer 94 made of a relatively soft metal material is to allow some amount of compression of the washer 94 and eliminate any backlash created when making fine adjustments from changing the direction of rotation of the cap screw 92, thereby eliminating the need of a lockdown screw. It is noted that a gap 96 exists between the wedge 34 and the side wall 42 of the cartridge 32 to allow adequate travel of the wedge 34 in the axial direction (i.e. in the direction of the y-axis) within the V-shaped cavity 20.

Figure 10:
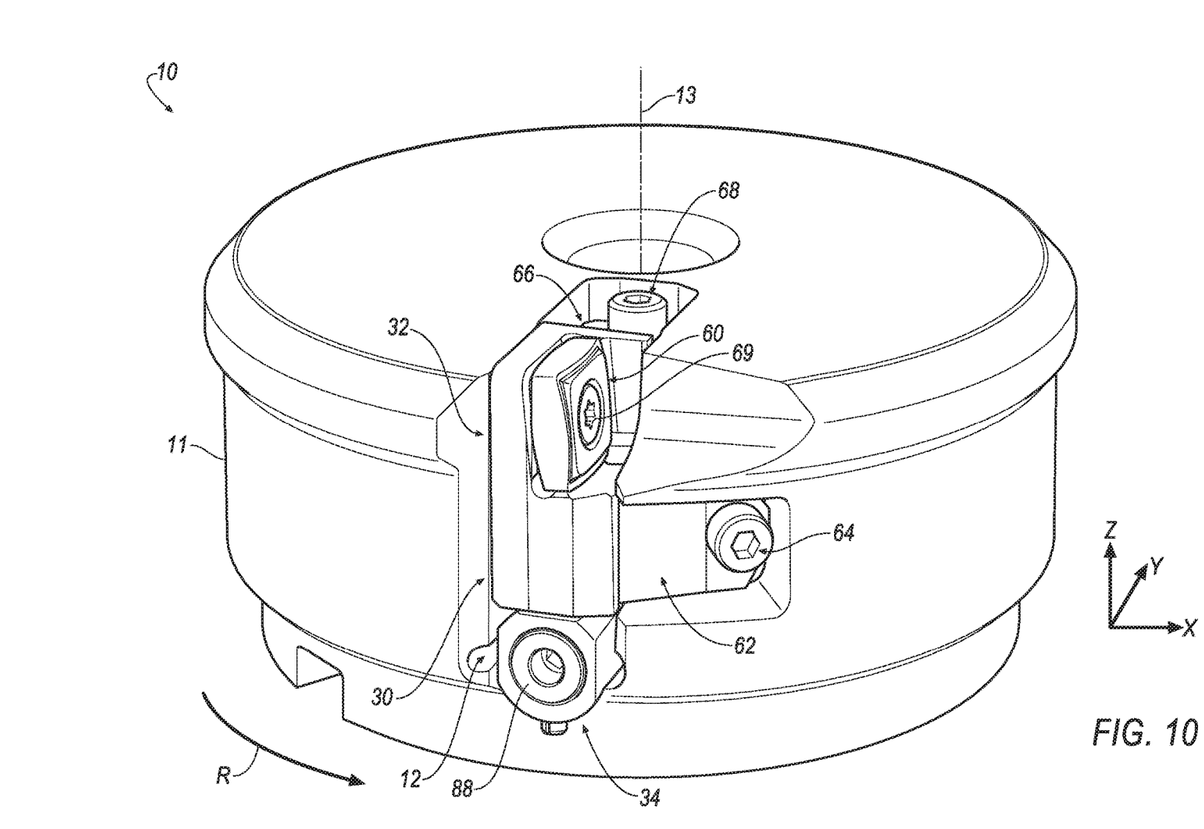
FIG. 10 is an isometric view of the cutting tool with the adjustable cartridge assembly mounted in a cartridge receiving pocket of the cutting tool according to an embodiment of the invention.
Figure 11:
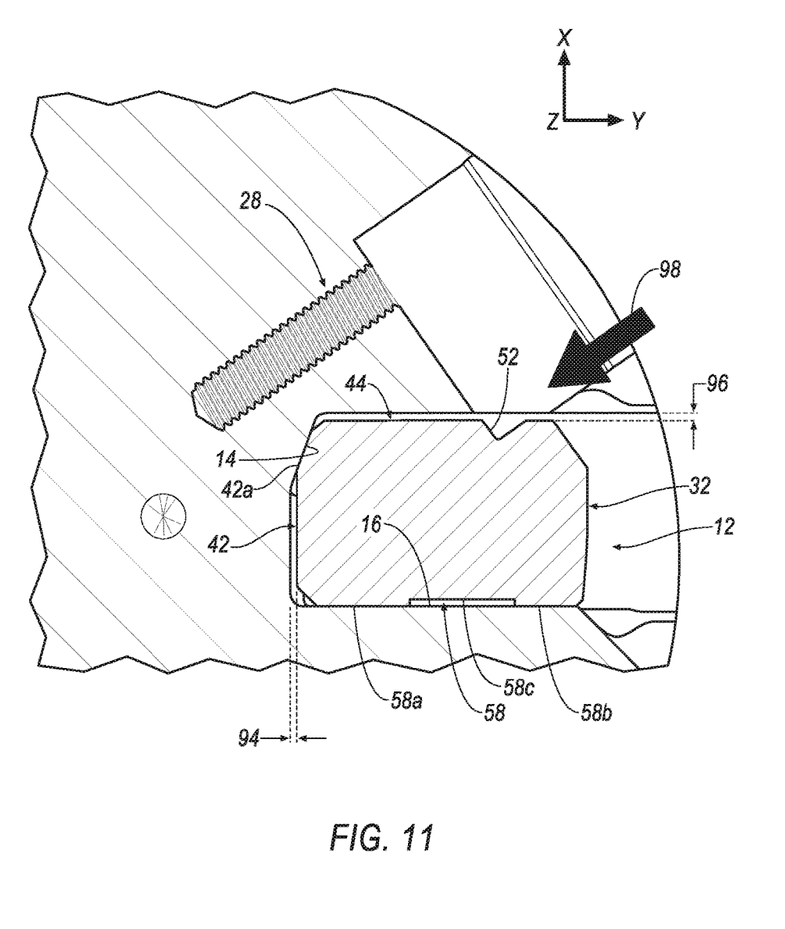
FIG. 11 is a cross-sectional view of the cartridge when mounted in the cartridge-receiving pocket according to an embodiment of the invention.

FIG. 10 shows the adjustable cartridge assembly 30 mounted in the cartridge-receiving pocket 12 of the cutting tool 10. FIG. 11 is a cross-section view of the cartridge 32 when mounted in the cartridge-receiving pocket 12. As seen in FIG. 11, the first end portion 58a and the second end portion 58b of the rear wall 58 of the cartridge 32 contact the axial support wall 16 of the cartridge-receiving pocket 12 when the adjustable cartridge assembly 30 is mounted in the cartridge-receiving pocket 12. It is noted that the central portion 58c does not contact the axial support wall 16. In addition, only the radial support wall 42a of second side wall 42 contacts the radial support wall 14 of the cartridge-receiving pocket 12 such that there is a clearance gap 94 between the second side wall 42 and the cartridge-receiving pocket 12. Further, there is a clearance gap 96 between the front wall 44 of the cartridge 32 and the cartridge-receiving pocket 12. As seen in FIG. 11, the first plate member 62 exerts a biasing force on the cartridge 32 in a radial direction, as indicated by the arrow 98, to securely hold the adjustable cartridge assembly 30 in the cartridge-receiving pocket 12.

As mentioned above, the planar surfaces 78, 79, 80 of the wedge member 34 are formed at the taper angle 82 between greater than about 0 degree and less than or equal to about 5 degrees. Thus, the cartridge assembly 30 can selectively adjust the position of the cutting insert 60 in the direction of the central axis 13 of the cutting tool 10. For example, for a taper angle 82 of about 2 degrees and a cap screw 92 with a thread pitch of about 0.7 mm, one full rotation (i.e. 360 degrees) of the cap screw 92 in either the clockwise or counterclockwise direction will result in a movement of the cutting insert 60 in the direction of the central axis 13 of the cutting tool 10 of about 0.0244 mm (0.00096 inches). One-eighth rotation (i.e. 45 degrees) of the cap screw 92 will result in a movement of the cutting insert 60 in the direction of the central axis 13 of the cutting tool 10 of about 0.0031 mm (0.00012 inches).

In another example, for a taper angle 82 of about 2 degrees and a cap screw 92 with a thread pitch of about 0.5 mm, one full rotation (i.e. 360 degrees) of the cap screw 92 in either the clockwise or counterclockwise direction will result in a movement of the cutting insert 60 in the direction of the central axis 13 of the cutting tool 10 of about 0.0175 mm (0.00069 inches). One-eighth rotation (i.e. 45 degrees) of the cap screw 92 will result in a movement of the cutting insert 60 in the direction of the central axis 13 of the cutting tool 10 of about 0.0022 mm (0.00009 inches).

As described above, the rotation of a threaded fastener 92 disposed within the wedge 34 causes the wedge 34 to move in a direction of the central axis 85 of the wedge 34 and the cutting insert 60 mounted in the insert-receiving pocket 50 of the cartridge 32 to move in a direction of the central axis 13 of the cutting tool 10. In other words, the adjustable cartridge assembly 30 of the invention selectively adjusts a position of the cutting insert 60 mounted in the insert-receiving pocket 50 of the cartridge 32. Thus, precise adjustment of the cutting insert 60 in the direction of the central axis 13 of the cutting tool 10 without the need for a lockdown screw is achieved, thereby providing a simplified design and reducing cost of the cutting tool 10.

The patents and publications referred to herein are hereby incorporated by reference.

Having described presently preferred embodiments the invention may be otherwise embodied within the scope of the appended claims.

What is claimed is:

1. A cutting tool comprising:
a cartridge-receiving pocket; and
an adjustable cartridge assembly mounted in the cartridge-receiving pocket, the adjustable cartridge assembly comprising a cartridge with an insert-receiving pocket and a wedge, wherein the cartridge includes a bottom wall, and wherein the wedge has a plurality of planar surfaces formed at a taper angle with respect to a plane that is parallel to a central axis of the wedge, at least one of the planar surfaces contacting the bottom wall of the cartridge to selectively adjust a vertical position of a cutting insert mounted in the insert-receiving pocket of the cartridge.

2. The cutting tool according to claim 1, wherein the taper angle is greater than 0 degrees and less than or equal to five degrees.

3. The cutting tool according to claim 1, wherein the adjustable cartridge assembly further comprises a first plate member having a first end capable of receiving a first threaded fastener and a second, opposite end engaging a first ledge formed in the cartridge, thereby acting as a flat spring to exert a biasing force on the cartridge in a radial direction of the cartridge.

4. The cutting tool according to claim 3, wherein the adjustable cartridge assembly further comprises a second plate member having a first end capable of receiving a second threaded fastener and a second, opposite end engaging a second ledge formed in the cartridge, thereby acting as a flat spring to exert a biasing force on the cartridge in an axial direction of the cartridge.

5. The cutting tool according to claim 1, wherein the adjustable cartridge assembly further comprises a threaded fastener disposed within a cavity of the wedge, and a stop member disposed within the cavity to prevent unwanted movement of the threaded fastener when rotating the threaded fastener.

6. The cutting tool according to claim 1, wherein the cartridge-receiving pocket includes a V-shaped cavity formed by a pair of opposing side surfaces and an arcuate bottom surface, and wherein the wedge is disposed within the V-shaped cavity so as to contact the pair of opposing side surfaces.

7. The cutting tool according to claim 1, wherein the cartridge includes a front wall with an upper portion with the insert-receiving pocket and a lower portion, the upper portion extending from a top wall to the lower portion, the lower portion extending from a bottom wall to the insert-receiving pocket.

8. The cutting tool according to claim 1, wherein the insert-receiving pocket includes a bottom support surface and a pair of side support surfaces for supporting a cutting insert mounted within the insert-receiving pocket.

9. The cutting tool according to claim 1, wherein the wedge further includes an end surface, an opposing end surface and a cylindrical outer surface, except for the plurality of planar surfaces.

10. The cutting tool according to claim 1, wherein the plurality of planar surfaces are at different distances from a central axis of the wedge.

11. An adjustable cartridge assembly, comprising:
a cartridge with an insert-receiving pocket and a bottom wall; and
a wedge having a plurality of planar surfaces formed at a taper angle with respect to a plane that is parallel to a central axis of the wedge, at least one of the plurality of planar surfaces contacting the bottom wall of the cartridge,
wherein rotation of a threaded fastener disposed within the wedge causes the wedge to move in a direction of a central axis of the wedge and causes a cutting insert mounted in the insert-receiving pocket of the cartridge to move in a direction of a central axis of a cutting tool.

12. The adjustable cartridge assembly according to claim 11, wherein the taper angle is greater than 0 degrees and less than or equal to five degrees.

13. The adjustable cartridge assembly according to claim 11, wherein the adjustable cartridge assembly further comprises a first plate member having a first end capable of receiving a first threaded fastener (64) and a second, opposite end engaging a first ledge formed in the cartridge, thereby acting as a flat spring to exert a biasing force on the cartridge in a radial direction of the cartridge.

14. The adjustable cartridge assembly according to claim 13, wherein the adjustable cartridge assembly further comprises a second plate member having a first end capable of receiving a second threaded fastener and a second, opposite end engaging a second ledge formed in the cartridge, thereby acting as a flat spring to exert a biasing force on the cartridge in an axial direction of the cartridge.

15. The adjustable cartridge assembly according to claim 11, wherein the adjustable cartridge assembly further comprises a threaded fastener disposed within a cavity of the wedge, and a stop member disposed within the cavity to prevent unwanted movement of the threaded fastener when rotating the threaded fastener.

16. The adjustable cartridge assembly according to claim 11, wherein the wedge is disposed within the V-shaped cavity of a cartridge-receiving pocket so as to contact a pair of opposing side surfaces of the V-shaped cavity.

17. The adjustable cartridge assembly according to claim 11, wherein the cartridge includes a front wall with an upper portion with the insert-receiving pocket and a lower portion, the upper portion extending from a top wall to the lower portion, the lower portion extending from a bottom wall to the insert-receiving pocket.

18. The adjustable cartridge assembly according to claim 11, wherein the insert-receiving pocket includes a bottom support surface and a pair of side support surfaces for supporting a cutting insert mounted within the insert-receiving pocket.

19. The adjustable cartridge assembly according to claim 10, wherein the wedge further includes an end surface, an opposing end surface and a cylindrical outer surface, except for the plurality of planar surfaces.

20. The adjustable cartridge assembly according to claim 10, wherein the plurality of planar surfaces are at different distances from a central axis of the wedge.

* * * * *